(12) United States Patent
Rodarte

(10) Patent No.: US 11,835,796 B1
(45) Date of Patent: Dec. 5, 2023

(54) EARPIECE-LESS GLASSES

(71) Applicant: Michael Renee Rodarte, Garden Grove, CA (US)

(72) Inventor: Michael Renee Rodarte, Garden Grove, CA (US)

(*) Notice: Subject to any disclaimer, the term of this patent is extended or adjusted under 35 U.S.C. 154(b) by 0 days.

(21) Appl. No.: 17/890,886

(22) Filed: Aug. 18, 2022

(51) Int. Cl.
 *G02C 3/00* (2006.01)
 *G02C 5/02* (2006.01)
 *G02C 5/12* (2006.01)

(52) U.S. Cl.
 CPC ............ *G02C 3/003* (2013.01); *G02C 5/02* (2013.01); *G02C 5/128* (2013.01)

(58) Field of Classification Search
 CPC .......... G02C 3/003; G02C 5/02; G02C 5/128; A63B 33/002; A63B 33/004; A63B 33/006; A61F 9/02; A61F 2009/021
 See application file for complete search history.

(56) References Cited

U.S. PATENT DOCUMENTS

| | | | | |
|---|---|---|---|---|
| 4,468,819 A | * | 9/1984 | Ohno | A61F 9/022 2/430 |
| 5,467,148 A | | 11/1995 | Conway | |
| 5,949,514 A | | 9/1999 | Wargon | |
| 6,112,334 A | * | 9/2000 | Chiang | A63B 33/006 2/452 |
| 6,289,523 B1 | * | 9/2001 | Chiang | A63B 33/006 2/445 |
| 7,883,205 B2 | | 2/2011 | Begg | |
| 9,642,749 B2 | | 5/2017 | McNeal | |
| 2002/0109818 A1 | | 8/2002 | Okui et al. | |
| 2002/0194669 A1 | * | 12/2002 | Takeshi | A63B 33/004 2/452 |
| 2004/0218140 A1 | | 11/2004 | Bleau | |
| 2009/0038063 A1 | * | 2/2009 | Chou | A63B 33/004 2/446 |
| 2010/0024098 A1 | * | 2/2010 | Chiang | A63B 33/004 2/442 |
| 2010/0309425 A1 | | 12/2010 | Zelazowski | |

(Continued)

FOREIGN PATENT DOCUMENTS

| | | | | |
|---|---|---|---|---|
| FR | 2700861 A1 | * | 7/1994 | ............... A61F 9/02 |
| FR | 2726373 A1 | | 5/1996 | |

(Continued)

OTHER PUBLICATIONS

Machine translation of FR 2700861 retrieved electronically from Espacenet Sep. 26, 2022 (Year: 2022).*

(Continued)

*Primary Examiner* — Cara E Rakowski
(74) *Attorney, Agent, or Firm* — Cybernetic Law PLLC; John Hocker (57) ABSTRACT

A pair of temple-less glasses to allow the user to have unrestricted access to their face while still being able to maintain having their glasses, equipped with a prescription, in place. The temple-less glasses have a first eye unit and a second eye unit connected to a nose piece by way of an attachment mechanism. The attachment mechanism is present on both the first eye unit and the second eye unit. The attachment mechanism functions by slidably attaching the attachment element of each eye unit to an attachment bar located on the outer left and right edge of the nose piece.

16 Claims, 6 Drawing Sheets

(56) References Cited

U.S. PATENT DOCUMENTS

| | | | | |
|---|---|---|---|---|
| 2014/0115760 | A1* | 5/2014 | Waller | A61F 9/027 2/431 |
| 2021/0030593 | A1* | 2/2021 | Kellogg | G02C 5/02 |
| 2021/0308530 | A1 | 10/2021 | Song | |
| 2022/0107507 | A1* | 4/2022 | Tomlinson | A63B 33/006 |

FOREIGN PATENT DOCUMENTS

| | | | | | |
|---|---|---|---|---|---|
| GB | 2380558 | A | * | 4/2003 | A63B 33/002 |
| GB | 2460448 | A | * | 12/2009 | A63B 33/002 |
| KR | 20090132433 | A | | 12/2009 | |
| KR | 101524149 | B1 | | 5/2015 | |

OTHER PUBLICATIONS

Rimless clip on nose glasses, Retrieved from Internet, Retrieved on May 27, 2022 <URL: https://www.amazon.com/Colors-glasses-Morpheus-rimless-sunglasses/dp/B075M9WVYH>.

Non-Final Office Action dated Sep. 15, 2023 issued in U.S. Appl. No. 18/348,213.

* cited by examiner

EARPIECE-LESS GLASSES

FIELD OF THE INVENTION

The present invention relates generally to glasses. More specifically, the present invention is a pair of glasses that rest upon the user's nose, allowing ease of access to the entire face without temples of standard glasses being in the way.

BACKGROUND OF THE INVENTION

Many people wear glasses due to near sightedness, far sightedness, or astigmatism. Glasses can sometimes interfere with everyday tasks the user partakes in. For example, when wearing glasses and needing to use a headset, the earpieces of the headset can push the earpieces of the eyewear causing the earpieces to dig into the skin of the wearer. Additionally, when brushing ones hair, often times the hair can get stuck under the earpieces of the eyewear or the bristles of the brush get caught on the earpiece of the eyewear and can pull the glasses off the wearer. Furthermore, ones peripheral view is obstructed by the earpiece of the glasses and does not provide for prescription coverage in the peripheral view.

An objective of the present invention is to provide user glasses that rest upon the wearers face. The glasses do not contain earpieces that run across the temples. The glasses have two domes, with the domes designed to sit on top of the eye socket, that are connected by a nose piece. The nose piece is equipped with a protrusion on each side, while each eye dome is equipped with a groove. The groove connects with the protrusion allowing the eye domes to be detached from the nose piece if needed.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
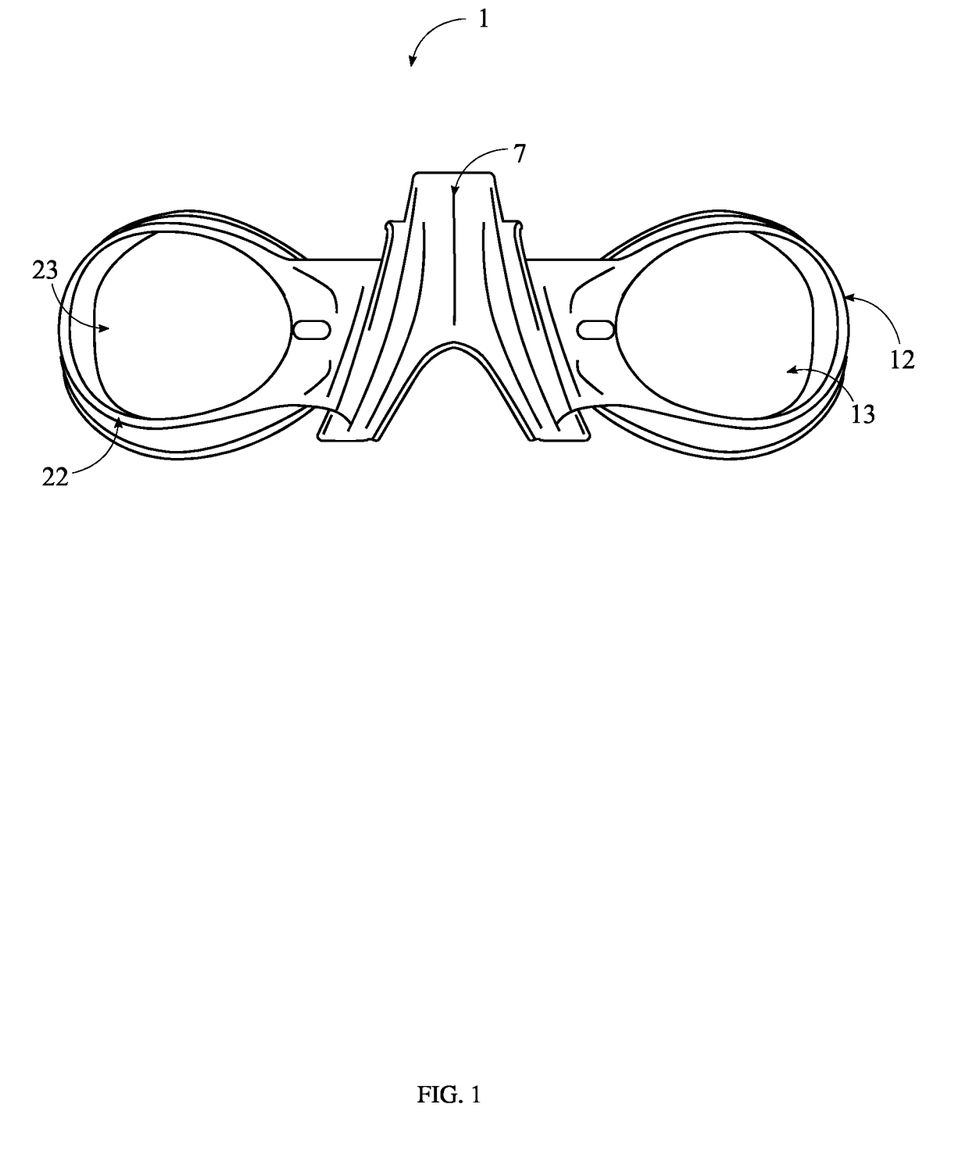
FIG. 1 is a front perspective view of the present invention.

As shown in FIG. 1, the present invention is glasses 1 that have no earpiece. An objective of the present invention is to provide glasses, which are capable of having a prescription lens, that do not have a temple/earpiece. This provides a pair of glasses to the wearer that allows full access to the face in addition to being able to wear headphones without having the earpieces that get pressed into the side of the face. Additionally, it will allow for makeup application and hair brushing without the earpieces being in the way. In its preferred embodiment, the present invention will be made out of plastic or any other suitable material that maintains the function of the invention.

Figure 2:
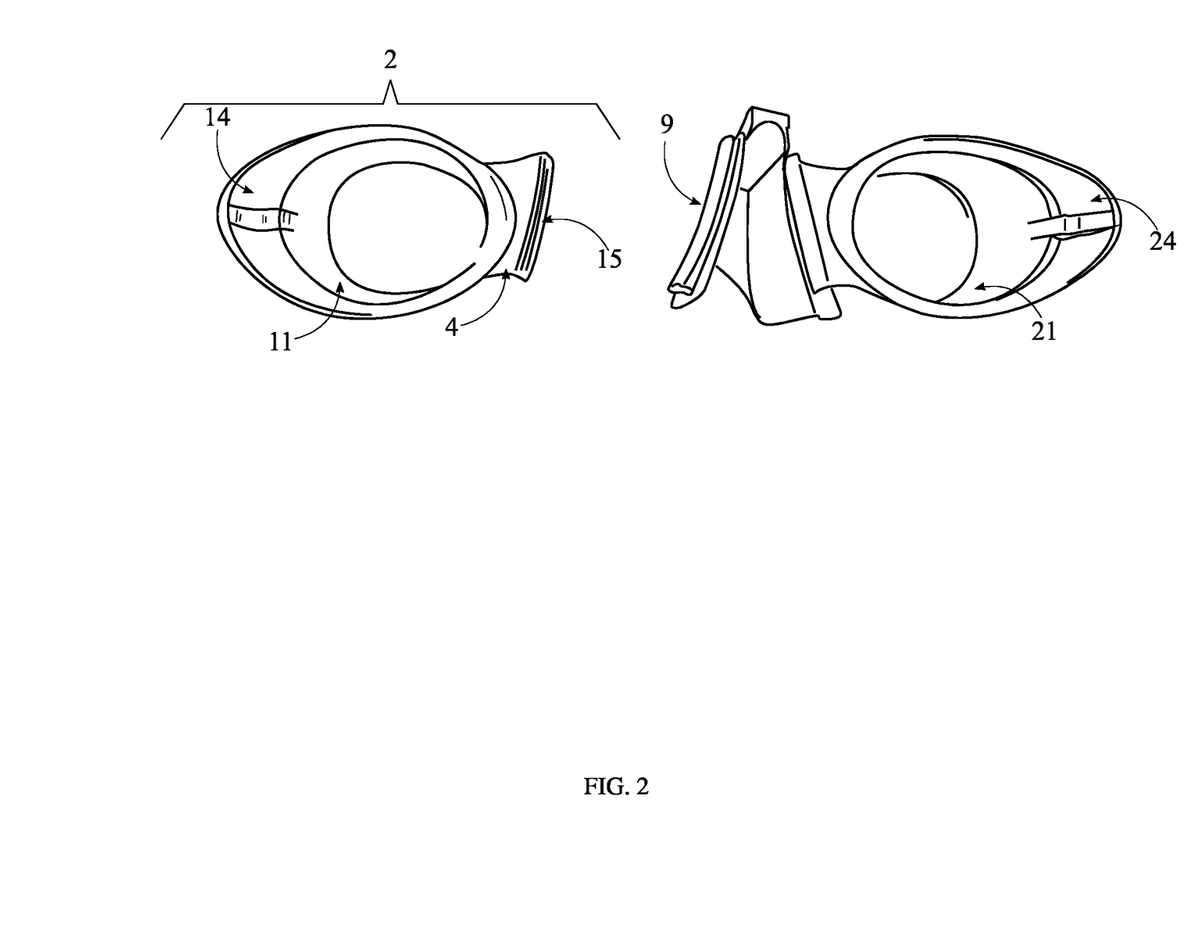
FIG. 2 is a rear perspective view of the present invention with left eye unit removed.
Figure 3:
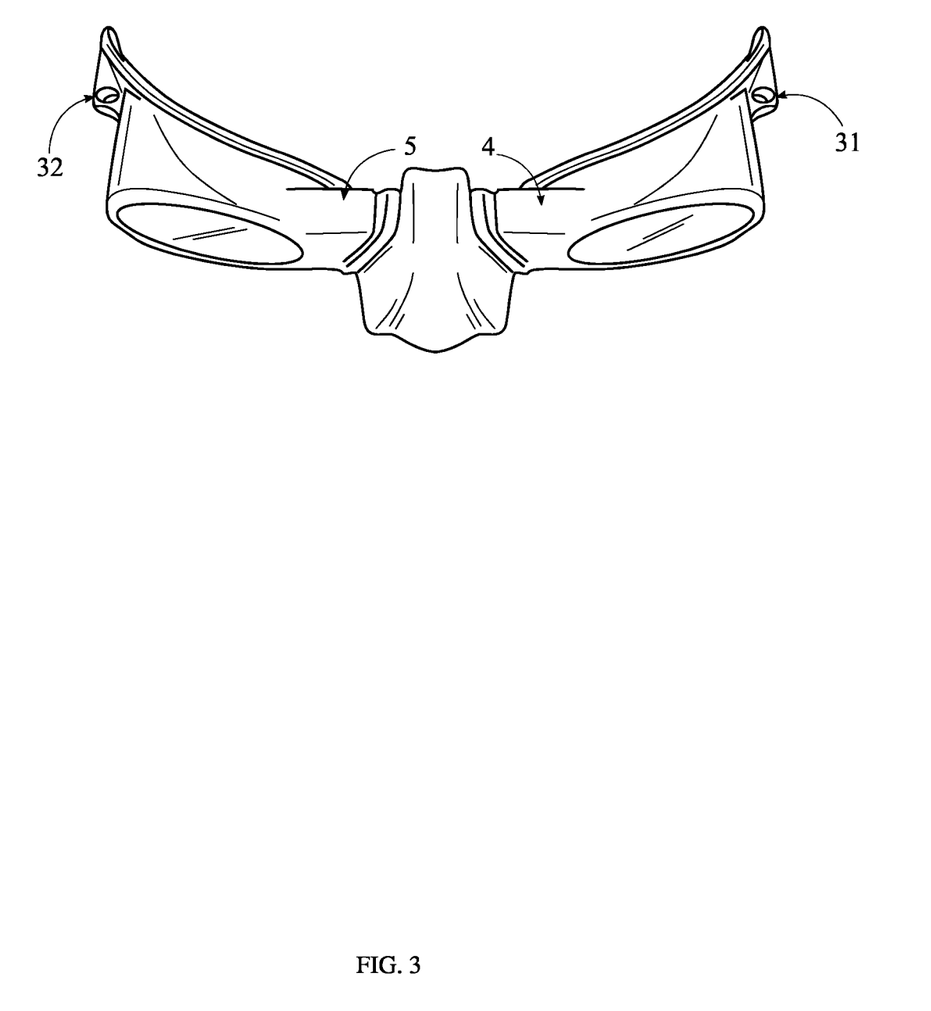
FIG. 3 is a top perspective exploded view of the present invention.

The present invention is comprised of a first eye unit 2, a second eye unit 3, and a nose piece 6. The first and second eye unit 3 are equipped with an attachment mechanism, allowing the first eye unit 2 or the second eye unit 3 to be easily removed from the nose piece 6 or exchanged out in the event a user's prescription changes and a new lens is needed as shown in FIG. 2. The first eye unit 2 is comprised of a first socket body wall 11, first body lip 12, a first socket body ring 14, and a first lens 13. The first socket body wall 11 is an oval shaped cylinder in which the wall is longer in the area of the socket body above the wearer's temple and shorter in the area above the users nose. Perimetrically attached to the first socket body wall 11, laying in direct contact with the wearers face, is the first socket body ring 14. The first socket body ring 14 is designed to form a seal around the wearer's eye, preventing debris from entering the wearer's eye. Perimetrically positioned around the first socket body wall 11, opposite the end where the first socket body ring 14 is located, is the first socket body lip 12. The first socket body lip 12 is also perimetrically attached to the first lens 13. The lenses of the present invention are equipped to be removed and allow for lenses of a different prescription to be used.

Extending inward towards the nose piece from the first eye unit 2, is the first attachment element 4. The first attachment element forms a bridge connecting the first eye unit 2 to the nose piece 6. The first attachment element 4 has a first attachment groove 15 traversing the length of the first attachment element, allowing the first attachment element 4 to be slidably attached to the nose piece 6.

The second eye unit 3 is comprised of a second socket body wall 21, second body lip 22, a second socket body ring 24, and a second lens 23. The second socket body wall 21 is an oval shaped cylinder in which the wall is longer in the area of the socket body above the wearer's temple and shorter in the area above the user's nose. Perimetrically attached to the second socket body wall 21, laying in direct contact with the wearers face, is the second socket body ring 24. The second socket body ring 24 is designed to form a seal around the wearers eye, preventing debris from entering the wearer's eye. Perimetrically positioned around the second socket body wall 21, opposite the end where the second socket body ring 24 is located, is the second socket body lip 22. The second socket body lip 22 is also perimetrically attached to the second lens 23.

Extending inward towards the nose from the second eye unit 3, is the second attachment element 5. The second attachment element forms a bridge connecting the second eye unit 3 to the nose piece 6. The second attachment element 5 has a second attachment groove 25 traversing the length of the second attachment element 5, allowing the second attachment element 5 to be slidably attached to second attachment bar of the nose piece 6.

Angularly attached to the first eye unit 2, where the first socket body ring 14 and the first socket body wall 11 attach, is a first loop 31. Angularly attached to the second eye unit 3, where the second socket body ring 24 and the second socket body wall 21 attach, is a second loop 32. The first loop 31 and second loop 32 are configured to allow a string or cord to be connected from the first loop 31 to the second loop 32 allowing the user additional security in keeping the eyewear in place on a user's face.

Figure 4:
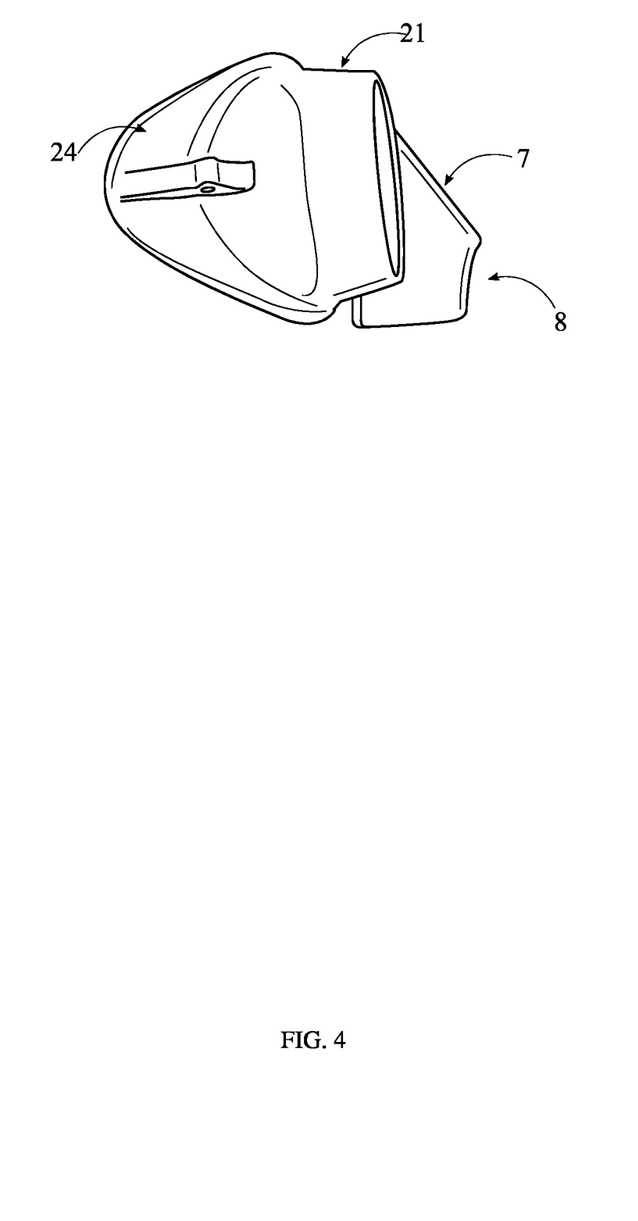
FIG. 4 is a left perspective exploded view of the present invention
Figure 5:
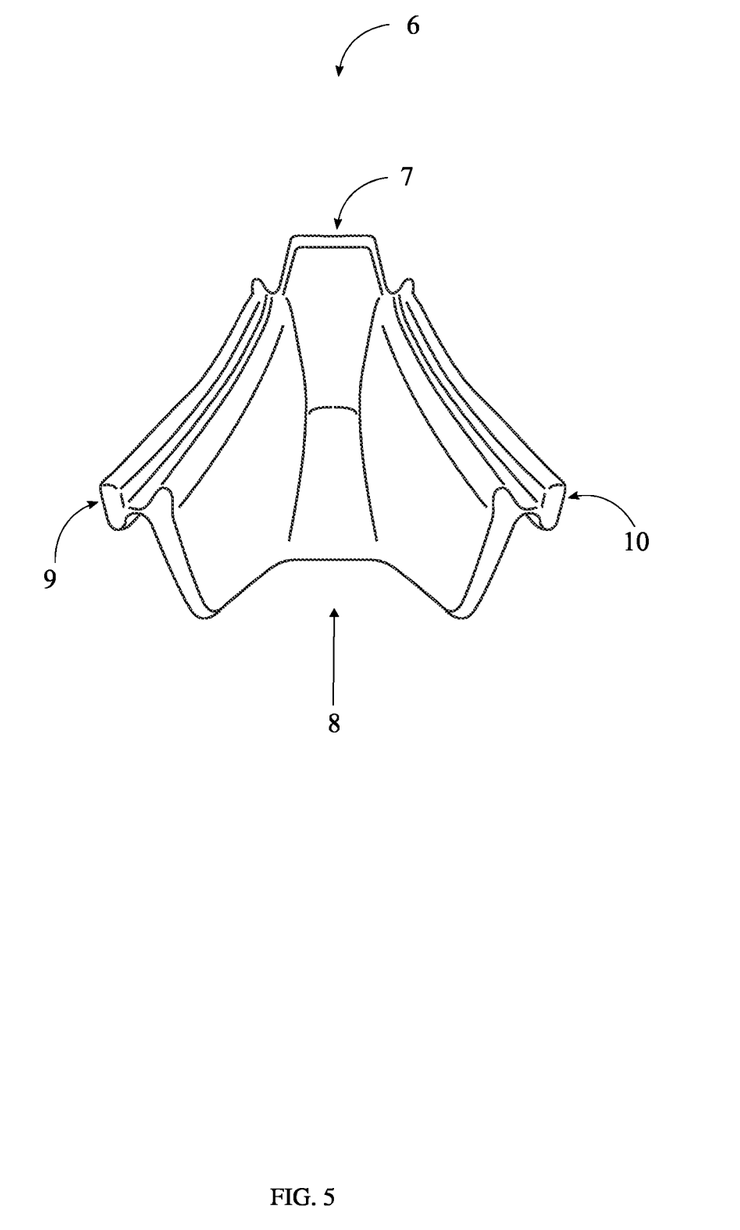
FIG. 5 is a rear bottom perspective view of the present invention of the nose piece.
Figure 6:
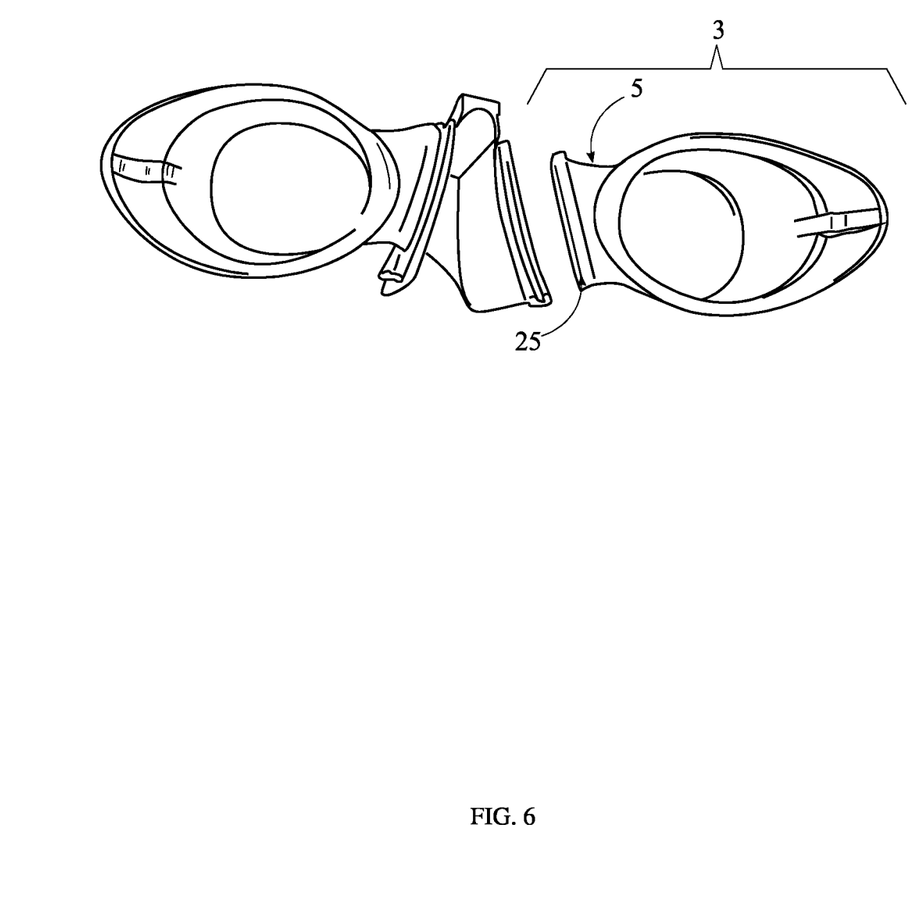
FIG. 6. is a rear perspective view of the present invention with the right eye unit removed.

In its preferred embodiment the nose piece 6 is made out of plastic and is bent and configured to lay in tandem with the user's nose. The nose piece 6 is positioned between the first eye unit 2 and the second eye unit 3 and held in place by way of an attachment mechanism on each eye unit. The nose piece 6 comprises a nose bridge 7, a nose cavity 8, a first attachment bar 9, and a second attachment bar 10. The nose bridge 7 comprising a first attachment bar 9 positioned on the front left edge of the nose bridge 7 traversing the entire length of the nose bridge 7 from the top of the nose bridge 7 to the bottom of the nose bridge. The nose bridge 7 further comprising a second attachment bar 10 on the front right edge of the nose bridge 7 traversing the entire length of the nose bridge 7 from the top of the nose bridge to the bottom of the nose bridge 7. The nose piece 6 has a nose cavity 8 formed at the bottom front of the nose bridge, allowing the tip of the user's nose to be exposed as shown in FIG. 4.

The first attachment bar 9 is configured to be slidably attached to the first attachment groove 15 of the first eye unit 2. The second attachment bar 10 is configured to be slidably attached to the second attachment groove 25 of the second eye unit 3.

Although the invention has been explained in relation to its preferred embodiment, it is to be understood that many other possible modifications and variations can be made without departing from the spirit and scope of the invention.

What is claimed is:

1. Temple-less glasses comprising:
a first eye unit;
a second eye unit; and
a nose-shaped nose piece, wherein
the first eye unit comprises a first socket body wall, a first lens, a first socket body ring, a first socket body lip, and a first attachment element;
the second eye unit comprises a second socket body wall, a second lens, a second socket body ring, a second socket body lip, and a second attachment element;
the first socket body wall is an oval shaped cylinder;
the first socket body wall is longer on one side;
the first attachment element extends inwards towards the nose-shaped nose piece from the first eye unit;
the first attachment element has a first attachment groove traversing the entire length of the first attachment element;
the first socket body lip is perimetrically positioned around the first socket body wall opposite the end where the first socket body ring is positioned;
the first socket body lip is perimetrically connected to the first lens;
the first socket body ring is perimetrically attached to the first socket body wall;
the first socket body ring is configured to lay in direct contact with a user's face;
the second socket body ring is an oval shaped cylinder;
the second socket body wall is longer on one side;
the second socket body ring is perimetrically attached to the second body wall;
the second socket body lip is perimetrically attached to the second body wall opposite the end of the second socket body ring;
the second socket body lip is perimetrically connected to the second lens;
the nose-shaped nose piece comprises a nose-shaped nose bridge, a nose cavity, a first attachment bar, and a second attachment bar;
the nose-shaped piece is bent and configured to lay in tandem with a user's nose;
the nose cavity is formed at the bottom front of the nose-shaped nose bridge;
the first attachment bar is located on the front right edge of the nose-shaped nose bridge;
the first attachment element is slidably attached to the first attachment bar;
the first eye unit's positioning on the nose-shaped nose piece is slidably adjustable;
the nose-shaped nose piece is positioned between the first eye unit and the second eye unit;
the first eye unit comprises a frit sloop angularly positioned where the frost socket body wall attaches to the first socket body ring;
the first loop has a through hole extending through the first loop;
the second eye unit comprises a second loop angularly positioned where the second socket body wall attaches to the second socket body ring;
the second loop has a through hole extending through the second loop;
the first eye unit is fully detachable from the nose-shaped nose piece; and
the second eye unit is fully detachable from the nose-shaped nose piece.

2. The temple-less glasses as in claim 1, wherein
the second attachment bar is located on the front left edge of the nose-shaped nose bridge;
the first attachment bar traverses the entire length of the nose-shaped nose bridge from the top of the nose-shaped nose bridge to the bottom of the nose-shaped nose bridge; and
the second attachment bar traverses the entire length of the nose-shaped nose bridge from the top of the nose-shaped nose bridge to the bottom of the nose-shaped nose bridge.

3. The temple-less glasses as in claim 1, wherein the second attachment bar is slidably attached to the second attachment groove of the second eye unit.

4. The temple-less glasses as in claim 3, wherein the second attachment element extends inwards towards the nose piece from the second eye unit;
the second attachment element is a second attachment groove traversing the entire length of the second attachment element; and
the second attachment element is slidably attached to the second attachment bar of the nose-shaped nose piece.

5. The temple-less glasses as in claim 1, wherein the nose-shaped nose bridge extends vertically past a top surface of at least one of the first socket body wall, the first socket body ring, the second socket body wall or the second socket body ring.

6. The temple-less glasses as in claim 1, wherein the nose-shaped nose bridge and the nose cavity both extend vertically past a top surface of at least one of the first socket body wall, the first socket body ring, the second socket body wall or the second socket body ring.

7. The temple-less glasses as in claim 1, wherein the nose-shaped nose bridge and the nose cavity both extend vertically past the first socket body wall, the first socket body ring, the second socket body wall and the second socket body ring.

8. The temple-less glasses as in claim 1, wherein the first lens and the second lens are magnification lenses.

9. The temple-less glasses as in claim 1, wherein the first lens and the second lens are prescription lenses.

10. The temple-less glasses as in claim 1, wherein the first lens and the second lens are lenses are equipped to be removed and replaced by lenses of a different prescription.

11. Temple-less glasses comprising:
a first eye unit;
a second eye unit; and
a nose-shaped nose piece, wherein
the nose-shaped nose piece comprises a nose-shaped nose bridge, a nose cavity, a first attachment bar, and a second attachment bar;
the nose-shaped nose piece is bent and configured to lay in tandem with a user's nose;
the nose cavity is formed at the bottom front of the nose-shaped nose bridge;
the first eye unit comprises a right socket body wall, a first lens, a first socket body lip, a first socket body ring, and a first attachment element;
the second eye unit comprises a second socket body wall, a second lens, a second socket body lip, a second socket body ring, and a second attachment element;
the first attachment element extends inwards towards the nose-shaped nose piece from the first eye unit;
the second attachment element extends inwards towards the nose-shaped nose piece from the second eye unit;
the second socket body ring is perimetrically attached to the second body wall;
the second socket body lip is perimetrically attached to the second body wall opposite the end of the second socket body ring;
the second socket body lip is perimetrically connected to the second lens;
the first attachment element has a first attachment groove traversing the entire length of the first attachment element;
the second attachment element has a second attachment groove traversing the entire length of the second attachment element;
the second attachment element is slidably attached to a second attachment bar of the nose-shaped nose piece,
the first socket body ring is perimetrically attached to the first socket body wall;
the first socket body ring is configured to lay in direct contact with a user's face; and
the second socket body wall is longer on one side.

12. The temple-less glasses as in claim 11 further comprising:
the first socket body wall is oval shaped cylinder;
the first socket body wall is longer on one side;
the first socket body lip is perimetrically positioned around the first socket body wall opposite the end where the firsts socket body ring is positioned; and
the first socket body lip is perimetrically connected to the first lens.

13. The temple-less glasses as in claim 11, wherein
the first attachment bar is positioned on the front right edge of the nose bridge;
the first attachment element is slidably attached to the first attachment bar;
the first eye unit's positioning on the nose-shaped nose piece is slidably adjustable when attached;
the second eye unit's positioning on the nose-shaped nose piece is slidably adjustable when attached;
the nose piece is positioned between the first eye unit and the second eye unit;
the nose cavity is formed at the front bottom of the nose bridge; and
the first attachment bar is slidably attached to a first attachment groove of the first eye unit.

14. The temple-less glasses as in claim 13, wherein
the second attachment bar is located at the front left edge of the nose-shaped nose bridge;
the first attachment bar traversing the entire length of the nose-shaped nose bridge from the top of the nose-shaped nose bridge to the bottom of the nose-shaped nose bridge;
the second attachment bar traverse the entire length of the nose-shaped nose bridge from the top of the nose-shaped nose bridge to the bottom of the nose-shaped nose bridge; and
the second attachment bar is slidably attached to a second attachment groove of the second eye unit;
the first eye unit is fully detachable from the nose-shaped nose piece; and
the second eye unit is fully detachable from the nose-shaped nose piece.

15. Temple-less glasses comprising:
a first eye unit;
a second eye unit;
a nose-shaped nose piece, wherein
the first eye unit comprises a right socket body wall, a first lens, a first socket body lip, a first socket body ring, and a first attachment element;
the second eye unit comprises second socket body wall, a second lens, a second socket body lip, a second socket body ring, and a second attachment element;
the nose-shaped nose pices comprises a nose-shaped nose bridge, a nose cavity, a frist attachement bar, and a second attachemnt bar;
the nose-shaped nose piece is bent and configured to lay in tandem with a user's nose;
the nose cavity is formed at the bottom front of the nose-shaped nose bridge;
the first attachment element extends inwards towards the nose-shaped nose piece from the first eye unit;
the second attachment element extends inwards towards the nose-shaped nose piece from the second eye unit;
the first attachment element has a first attachment groove traversing the entire length of the first attachment element;
the first attachment element is slidably attached to the first attachment bar of the nose-shaped nose piece;
the second attachment element has a second attachment groove traversing the entire length of the second attachment element; and
the second attachment element is slidably attached to the second attachment bar of the nose-shaped nose piece.

16. The temple-less glasses as in claim 15, wherein
the first attachment bar is located on the front right edge of the nose-shaped nose bridge;
wherein the first eye unit's positioning on the nose-shaped nose piece is slidably adjustable when attached;
wherein the second eye unit's positioning on the nose-shaped nose piece is slidably adjustable when attached;
the nose-shaped nose piece is positioned between the first eye unit and the second eye unit;

the first attachment bar is slidably attached to the first attachment groove of the first eye unit;
the second attachment bar is located at the front left edge of the nose-shaped nose bridge;
the first attachment bar traverses the entire length of the nose-shaped nose bridge from the top of the nose-shaped nose bridge to the bottom of the nose-shaped nose bridge;
the second attachment bar traversing the entire length of the nose-shaped nose bridge from the top of the nose-shaped nose bridge to the bottom of the nose-shaped nose bridge; and
the second attachment bar is slidably attached to the second attachment groove of the second eye unit.

* * * * *